(12) United States Patent
Reynolds et al.

(10) Patent No.: US 12,184,710 B2
(45) Date of Patent: Dec. 31, 2024

(54) REPORTING PLATFORM SYSTEM

(71) Applicant: Twilio Inc., San Francisco, CA (US)

(72) Inventors: Scott Reynolds, San Francisco, CA (US); Sriram Ramarathnam, San Ramon, CA (US); Jack Alan Littleton, Elk Grove, CA (US); Ravindra Ishmitra Bhanot, Foster City, CA (US); Thomas Tobin, Tiburon, CA (US); Sara Falkoff, Oakland, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 16/725,692

(22) Filed: Dec. 23, 2019

(65) Prior Publication Data

US 2021/0194943 A1  Jun. 24, 2021

(51) Int. Cl.
*H04L 65/60* (2022.01)
*G06F 16/953* (2019.01)
*H04L 65/61* (2022.01)

(52) U.S. Cl.
CPC ............ *H04L 65/60* (2013.01); *G06F 16/953* (2019.01); *H04L 65/61* (2022.05)

(58) Field of Classification Search
CPC .... H04L 65/60; H04L 65/4069; G06F 16/953
See application file for complete search history.

(56) References Cited

U.S. PATENT DOCUMENTS

| | | | | |
|---|---|---|---|---|
| 9,734,222 | B1* | 8/2017 | Milne | G06F 7/00 |
| 2003/0005455 | A1* | 1/2003 | Bowers | H04N 21/60 |
| | | | | 725/90 |
| 2012/0188106 | A1* | 7/2012 | Frome | G06F 3/1243 |
| | | | | 341/50 |
| 2013/0179219 | A1* | 7/2013 | Ross | G06Q 30/0202 |
| | | | | 705/7.31 |
| 2015/0242381 | A1* | 8/2015 | Oh | H04L 51/066 |
| | | | | 715/204 |
| 2016/0224643 | A1* | 8/2016 | Robichaud | G06F 11/3006 |
| 2016/0224651 | A1* | 8/2016 | Kumarasamy | G06F 16/275 |
| 2016/0248791 | A1* | 8/2016 | Tidwell | G06F 16/282 |
| 2016/0343071 | A1* | 11/2016 | Schnidman | G06F 16/954 |
| 2017/0139996 | A1* | 5/2017 | Marquardt | G06F 16/2272 |
| 2017/0189815 | A1* | 7/2017 | Tweedale | A63F 13/212 |
| 2018/0032634 | A1* | 2/2018 | Greenberg | G06F 16/8373 |

* cited by examiner

*Primary Examiner* — Dhairya A Patel
*Assistant Examiner* — Sujana Khakural
(74) *Attorney, Agent, or Firm* — Schwegman Lundberg & Woessner, P.A.

(57) ABSTRACT

Disclosed are systems, methods, and non-transitory computer-readable media for a reporting platform system. The reporting platform system receives a configuration object for an account that defines a format in which communication data associated with the account will be received by the reporting platform system, and a format into which the communication is to be reformatted. The reporting platform system receives a stream of communication data associated with the account and converts the stream of communication data in real-time based on the configuration object for the account. The resulting converted communication data is in the converted format defined by the configuration object. The reporting platform system provides query functionality on the converted communication data.

14 Claims, 8 Drawing Sheets

REPORTING PLATFORM SYSTEM

TECHNICAL FIELD

An embodiment of the present subject matter relates generally to data reporting and, more specifically, to a reporting platform system.

BACKGROUND

Communications have transformed rapidly in the past 10 years as traditional phone lines are replaced by Voice Over Internet Protocol (VoIP), instant messaging, video, etc. This transition to providing communications using the Internet has allowed Software as a Service (SasS) providers to provide communication services for their clients. Providing communication as a service frees customers from having to purchase and manage the hardware needed to provide communications. Providing communication services for multiple customers provides challenges, however, as each individual customer may have specific needs regarding managing and reporting of their data. This is problematic as each client's data may be in a different format and the clients may wish to have their data processed and managed differently. Accordingly, improvements are needed.

SUMMARY

A cloud-based communication platform provides communication services for multiple accounts of the cloud-based communication platform. Each account may be associated with a different customer of the cloud-based communication platform (e.g., individual user, set of users, company, organization, online service, etc.). The communication services provided by the cloud-based communication platform may include a variety of cloud-based communication services, such as facilitating communication sessions between endpoints (e.g., client devices), managing incoming communication requests, routing communication requests to an appropriate endpoint, logging data associated with communication sessions, etc.

The communication services provided by the cloud-based communication platform may be incorporated into a customer's application or website such that users of the customer's application or website may utilize the communication services facilitated by the cloud-based communication platform through use of the customer's application or website. For example, a customer that provides a ride sharing application may incorporate the communication services facilitated by the cloud-based communication platform into their application to enable users of the application to establish a communication session (e.g., phone call, chat session, etc.) with their assigned driver. As another example, a customer that provides a dating application may incorporate the communication services facilitated by the cloud-based communication platform to enable users of the dating application to establish communication session with other users.

Users of the application may not have knowledge that the communication services they are using through the application are being facilitated by the cloud-based communication platform. That is, the communication services may be presented as being a part of the application itself rather than provided by the cloud-based communication platform. In this way, the communication services facilitated by the cloud-based communication platform are provided as SaaS.

The communication services provided by the cloud-based communication platform may also include a call center service. For example, the cloud-based communication platform may facilitate various aspects of a call center for a company. The cloud-based communication platform allocates a contact identifier (e.g., phone number, URL, etc.) to the call center provided for an account. The contact identifier enables users to contact the contact center, such as by calling the phone number, initiating an instant message chat session, etc. A company or other entity utilizing the functionality of the cloud-based communication platform may provide the contact identifier to their users by, for example, posting the contact identifier on their website, including it in their application, etc.

As part of the call center service, the cloud-based communication platform receives and manages incoming communications (e.g., calls, messages, etc.) directed to the call center. For example, the cloud-based communication platform may route the incoming communications to an appropriate agent associated with the account, establish communication session between a client device of the agent and a client device of a user, etc. The cloud-based communication platform may also provide a call center interface that may be accessed by employees, administrators, and/or other agents associated with the account to utilize the functionality of the call center. For example, the call center interface may present an agent with a listing of their active communication sessions, allow for the agent to switch among and participate in the active communication sessions, etc.

The cloud-based communication platform provides customizable reporting functionality for customers. For example, the cloud-based communication platform utilizes a reporting platform system that converts a customer's communication data into a format specified by the customer. Converting the communication data may include extracting specified portions of the communication data and entering the extracted data into defined data tables. The reporting platform system provides customers with query functionality in relation to the converted data. For example, the reporting platform system allows customers to search the converted data, generate reports, set alerts, automate actions, etc.

The reporting platform system uses a configuration object to allow a customer to customize the reporting functionality provided by the reporting platform system to the customer's specific needs. The configuration object is a data object that defines an initial format in which communication data for the customer will be received by the reporting platform system, as well as a subsequent format into which the reporting platform system is to convert the received communication data. For example, the configuration object may include instructions for parsing the received communication data to extract desired portions of the communication data, as well as how the extracted data should be formatted and/or added to data tables.

A customer prepares the configuration object based on their specific needs and provides the configuration object to the reporting platform system. In turn, the reporting platform system uses the configuration object to convert the customer's communication data as specified. For example, the reporting platform system receives a stream of communication data for the customer and converts the communication data based on the configuration object. That is, the reporting platform system converts the communication data from the initial format defined by the configuration into the subsequent format defined by the configuration object. The reporting platform system may perform this process in real-time or near real-time, thereby allowing customers to monitor communication performance and react quickly if needed.

The reporting platform system provides a query functionality in relation to the converted communication data. For example, the reporting platform system allows users to define data dimensions and measures to execute search queries, generate reports, etc. The reporting platform system also allows users to set notifications and/or alerts in response to user specified events. For example, the user may set threshold values or combination of values that, if met, cause an alert or notification. As another example, the reporting platform system allows users to automate actions in response to user specified events. For example, the user may define an action or set of actions to be performed if certain conditions are met.

Some customers may wish to maintain a copy of the converted communication data. For example, a customer may wish to simply store the converted communication data within their local system for recording purposes. As another example, a customer may wish to maintain a copy of the converted communication data for use in customer-developed or third-party tools. Accordingly, the reporting platform system may provide the converted communication data to an external computing system defined by the customer. For example, the external computing system may be an external computing system of the customer or a third-party external computing system.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Figure 1:
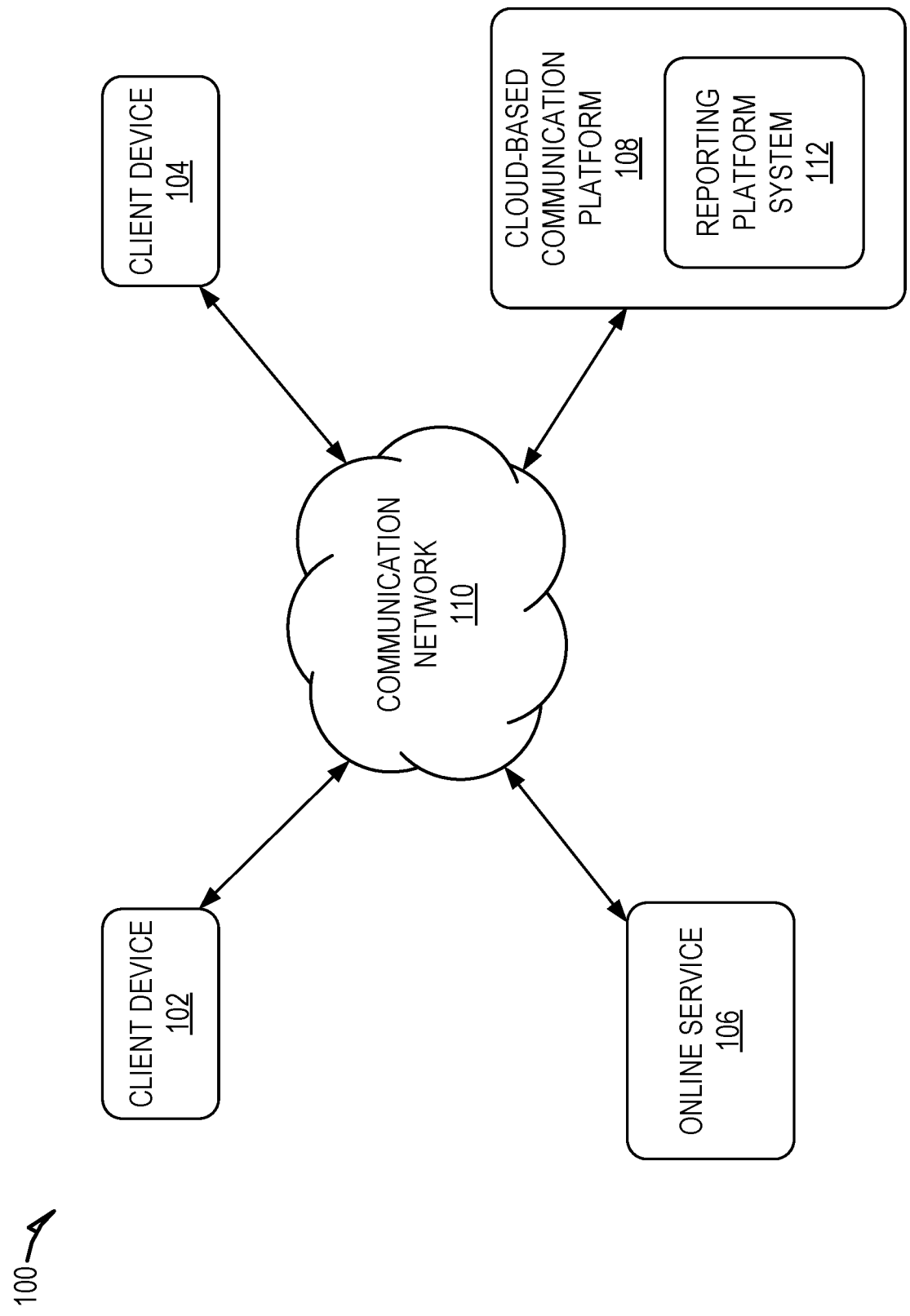
FIG. 1 shows an example system for a communication platform providing a reporting platform system, according to some example embodiments.

Disclosed are systems, methods, and non-transitory computer-readable media for a communication platform providing a reporting platform system. FIG. 1 shows an example system 100 for a communication platform providing a reporting platform system, according to some example embodiments. As shown, multiple devices (i.e., client device 102, client device 104, online service 106, and cloud-based communication platform 108) are connected to a communication network 110 and configured to communicate with each other through use of the communication network 110. The communication network 110 is any type of network, including a local area network (LAN), such as an intranet, a wide area network (WAN), such as the internet, or any combination thereof. Further, the communication network 110 may be a public network, a private network, or a combination thereof. The communication network 110 is implemented using any number of communication links associated with one or more service providers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 800 shown in FIG. 8.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

In the system 100, users interact with the online service 106 to utilize the services provided by the online service 106. Users communicate with and utilize the functionality of the online service 106 by using the client devices 102 and 104 that are connected to the communication network 110 by direct and/or indirect communication. The online service 106 may be any type of service provided online, such as a ride-sharing service, reservation service, retail service, news service, etc.

Although the shown system 100 includes only two client devices 102, 104, this is only for ease of explanation and is not meant to be limiting. One skilled in the art would appreciate that the system 100 can include any number of client devices 102, 104. Further, the online service 106 may concurrently accept connections from and interact with any number of client devices 102, 104. The online service 106 supports connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, and so forth.

A user interacts with the online service 106 via a client-side application installed on the client devices 102 and 104. In some embodiments, the client-side application includes a component specific to the online service 106. For example, the component may be a stand-alone application, one or more application plug-ins, and/or a browser extension. However, the users may also interact with the online service 106 via a third-party application, such as a web browser, that resides on the client devices 102 and 104 and is configured to communicate with the online service 106. In either case, the client-side application presents a user interface (UI) for the user to interact with the online service 106. For example, the user interacts with the online service 106 via a client-side application integrated with the file system or via a webpage displayed using a web browser application.

The online service 106 is one or more computing devices configured to provide an online service. The online service 106 may be any type of service, such as a banking service, travel service, retail service, etc. As a part of its provided functionality, the online service 106 may incorporate communication services that enable users of the online service 106 to communicate with agents of the online service 106, other users of the online service 106, etc. That is, the online service 106 may enable users to initiate communication sessions with agents and/or other users in which the participants of the communication session may communicate with each other via one or more communication channels, such as voice, text, etc. For example, a banking service may allow a user to initiate a communication session with an agent to discuss banking issues, check account balances, transfer funds, etc. Likewise, a retail service may allow users to initiate a communication session with an agent to place an order, initiate a return, etc.

A communication session is any type of communication between two or more client devices 102, 104, such as text communication, voice communication (e.g., phone call), video communication (e.g., video conference), etc. Implementing communication functionality may be difficult, particularly for an online service 106 that provides services unrelated to communications, such as banking services, retail services, etc. The cloud-based communication platform 108 alleviates this issue by providing cloud-based communication functionality that can be easily implemented by an online service 106 to provide communication services as part of the online service 106. Accordingly, the cloud-based communication platform 108 is a SaaS provider that concurrently provides communication services for multiple online services 106.

To utilize the communication services provided by the cloud-based communication platform 108, an online service 106 creates an account with the cloud-based communication platform 108 and uses an API provide by the cloud-based communication platform 108 to modify a programming application and/or website of the online service 106. Inclusion of the API causes the programming application and/or website to communicate with the cloud-based communication platform 108 to provide communication services provided by the cloud-based communication platform 108 through the application and/or website of the online service 106.

As an example, an online service 106 that provides a ride sharing application may utilize the communication services provided by the cloud-based communication platform 108 to enable users and drivers of the ride sharing application to communicate with each other. As another example, an online service 106 that provides a dating application may utilize the communication services provided by the cloud-based communication platform 108 to enable users and drivers of the dating application to communicate with each other. To accomplish this, the online service 106 may use the API provided by the cloud-based communication platform 108 to cause the online service 106 to communicate with the cloud-based communication platform 108 to initiate a communication session between specified users. For example, the online service 106 transmits an API call to the cloud-based communication platform 108 to execute the communication session. The API provided by the cloud-based communication platform 108 may define the syntax and format for the API call, including the parameters to include in the API call to initiate the desired communication session.

The cloud-based communication platform 108 provides customers (e.g., online services utilizing the functionality of the cloud-based communication platform 108) with customizable reporting functionality. For example, the cloud-based communication platform 108 includes a reporting platform system 112 that provides customizable reporting functionality. Although the reporting platform system 112 is shown as being incorporated within the cloud-based communication platform 108, this is only one embodiment and is not meant to be limiting. In some embodiments, the reporting platform system 112 may be partially or completely independent of the cloud-based communication platform system 108.

To provide customizable reporting functionality, the reporting platform system 112 converts a customer's communication data into a format specified by the customer. Converting the communication data may include extracting specified portions of the communication data and entering the extracted data into defined data tables. The reporting platform system 112 provides customers with query functionality in relation to the converted data. For example, the reporting platform system 112 allows customers to search the converted data, generate reports, set alerts, automate actions, etc.

The reporting platform system 112 uses a configuration object to allow a customer to customize the reporting functionality provided by the reporting platform system 112 to the customer's specific needs. The configuration object is a data object that defines an initial format in which communication data for the customer will be received by the reporting platform system 112, as well as a subsequent format into which the reporting platform system 112 is to convert the received communication data. For example, the configuration object may include instructions for parsing the received communication data to extract desired portions of the communication data, as well as instructions for formatting and/or adding the extracted data to data tables.

A customer prepares the configuration object based on their specific needs and provides the configuration object to the reporting platform system 112. For example, a customer of the cloud-based communication platform 108 uses a client device 102 to prepare the configuration object, as well as to communicate with the cloud-based communication platform 108 to provide the configuration object to the reporting platform system 112.

In turn, the reporting platform system 112 uses the configuration object to convert the customer's communication data as specified in configuration object. For example, the reporting platform system 112 receives a stream of communication data for the customer and convert the communication data based on the configuration object. The reporting platform system 112 may receive the stream of communication data from the cloud-based communication platform 108 and/or the online service 106 associated with the customer.

The configuration data received in the configuration data stream may be in the initial format defined by the configuration object provided by the customer. The reporting platform system 112 uses the configuration object to convert the communication data from the initial format defined by the configuration object into the subsequent format defined by the configuration object. The reporting platform system 112 may perform this process in real-time or near real-time, thereby allowing customers to monitor performance of communications and react quickly if an issue is detected.

The reporting platform system 112 provides query functionality in relation to the converted communication data. For example, the reporting platform system 112 allows customers to define parameters (e.g., data dimensions, measures, etc.) to execute search queries, generate reports, etc. A customer may use a client device 102 to communicate with the cloud-based communication platform 108 to provide data defining the data dimensions, measures, etc., for executing the search query and/or generating a desired report. In some embodiments, the reporting platform system 112 may provide a query interface that may be accessed by using a client device 102 to communicate with the cloud-based communication platform 108. A customer may use the query interface to provide data and use the query functionality provided by the reporting platform system 112.

As another example, a customer may prepare a file (e.g., JavaScript Object Notation (JSON) file) defining parameters (e.g., data dimensions, measures, etc.) to use the query functionality provided by the reporting platform system 112. The customer may use a client device 102 to prepare the file, as well as to communicate with the cloud-based communication platform 108 and provide the file to the reporting platform system 112.

The reporting platform system 112 also allows users to set notifications and/or alerts in response to occurrence of user specified events. For example, the user may set conditions that, if met, cause an alert or notification. The condition may be any type of condition, such as threshold or set of thresholds being met (e.g., exceeded). As another example, the reporting platform system 120 allows users to automate actions in response to occurrence of user specified events. For example, a user may user a client device 102 to define an action or set of actions to be performed if certain conditions are met.

Some customers may wish to maintain a copy of the converted communication data. For example, a customer may wish to simply store the converted communication data within their local system for recording purposes. As another example, a customer may wish to maintain a copy of the converted communication data for use in customer-developed or third-party tools. Accordingly, the reporting platform system 112 may provide the converted communication data to an external computing system defined by the customer. For example, the external computing system may be an external computing system of the customer (e.g., online service 106) or a third-party external computing system.

Figure 2:
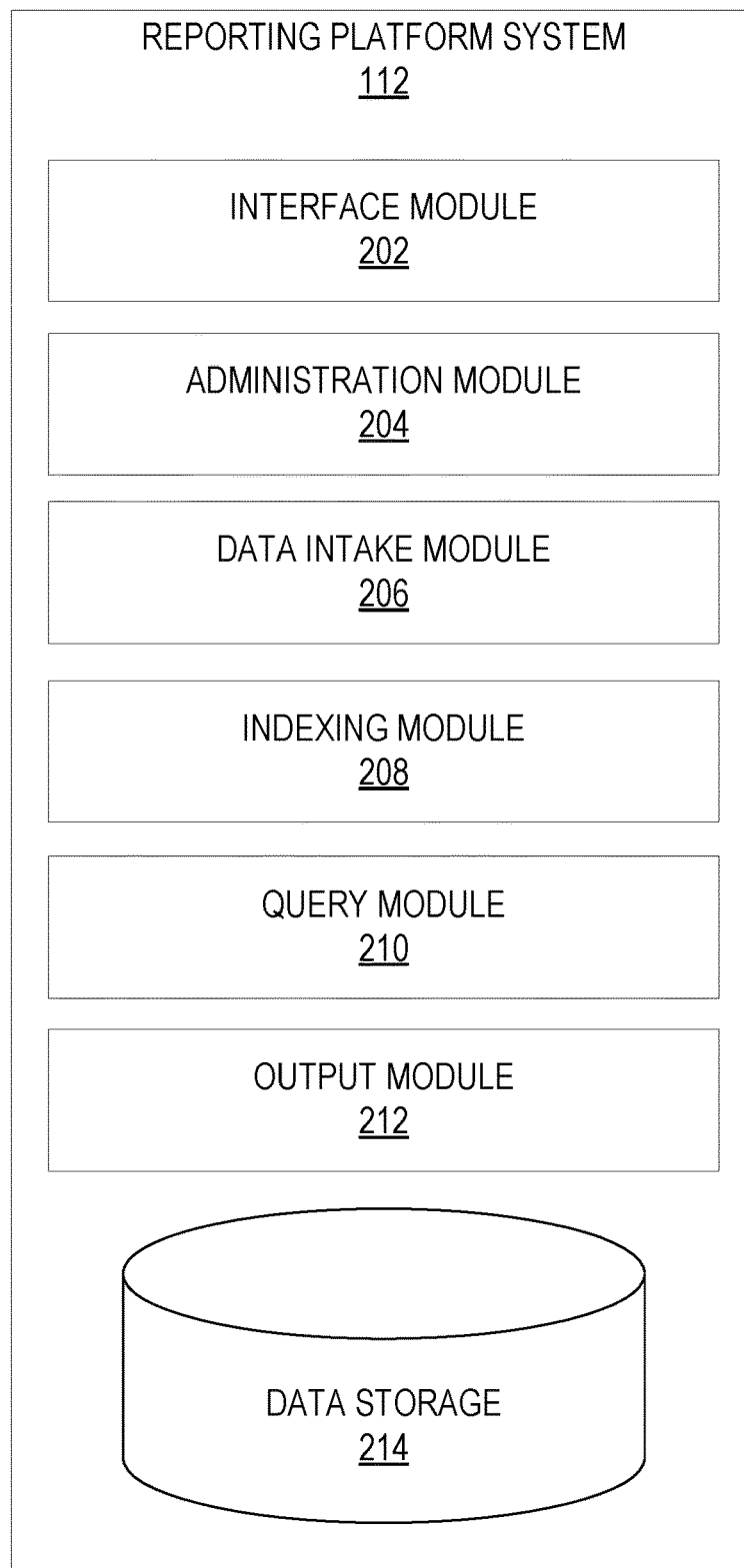
FIG. 2 is a system diagram of a reporting platform system, according to some example embodiments.

FIG. 2 is a system diagram of a reporting platform system 112, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the reporting platform system 112 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the reporting platform system 112 includes an interface module 202, an administration module 204, a data intake module 206, an indexing module 208, a query module 210, an output module 212, and a datastore 214.

The interface module 202 provides a user interface that allows users to communicate with and utilize the functionality of the reporting platform system 112. For example, a user may use a client device 102 to communication with the reporting platform system 112 and the interface module 202 may provide a user interface to be presented on a display of the client device 102. The user interfaces provided by the interface module 202 may include user interface elements, such as buttons, text fields, scroll bars, etc., that allow users to provide input and utilize the offered functionality of the reporting platform system 112. Further, the user interfaces provided by the interface module 202 may present data to the user, such as text, images, reports, etc.

The interface module 202 may provide various user interfaces for the different types of functionality offered by the reporting platform system 112. For example, the interface module 202 may provide an administration interface that enables users to generally configure and manage use of the functionality of the reporting platform system 112. For example, the administration interface may enable users to initiate and configure communication data ingestion by the reporting platform system 112, update existing ingestions, check the status of running ingestions, cancel and/or pause existing ingestions, etc. As another example, the interface module 202 may provide a query interface that enables users to enter query parameters and other data to search converted communication data, generate reports, set alerts and/or notifications, or configure automated actions.

In some embodiments, the interface module 202 may provide different versions of user interfaces to users based on permission levels, roles, or other factors associated with the users. For example, the interface module 202 may present an administration interface to users that are assigned as administrators for a user account or users that have an appropriate permission level. As another example, the interface module 202 may present a version of an administration interface that provides more functionality and features to a user that is assigned as an administrator or has a high permission level, and a different version of the administration interface that provides less functionality and features to a user that is not assigned as an administrator or has a lower permission level. Similarly, the interface module 202 may limit access to and/or present different versions of a query interface based on the roles and/or permission levels of the users.

The administration module 204 provides for configuration and use of the functionality provided by the reporting platform system 112. For example, the administration module 204 acts as a control panel that allows users to initiate and configure communication data ingestion by the reporting platform system 112, update existing ingestions, check the status of running ingestions, cancel and/or pause existing ingestions, etc.

The administration module 204 performs this by gathering data from users, updating data stored in the data storage 214, and instructing the other modules of the reporting platform system 112. For example, the administration module 204 gathers a configuration data object from a customer to customize the reporting functionality provided by the reporting platform system 112 for the customer's specific needs. The configuration object is a data object that defines an initial format in which communication data for the customer will be received by the reporting platform system 112, as well as a subsequent format into which the reporting platform system 112 is to convert the received communication data. For example, the configuration object may include instructions for parsing the received communication data to extract desired portions of the communication data, as well as how the extracted data should be formatted and/or added to data tables.

In some embodiments, the administration module 204 gathers the configuration object through use of an administration interface provided by the interface module 202. For example, the customer uses a client device 102 to communicate with the cloud-based communication platform 108 and access the administration interface. The administration interface may prompt the customer data, which is used to generate the configuration object. Alternatively, the customer may prepare the configuration object, which is transmitted to the reporting platform system 112 and received by the administration module 204.

The configuration object provides data used by the various modules of the reporting platform system 112 to enable communication data ingestion, conversion and reporting. Accordingly, the administration module 204 makes the configuration object available to the various modules. For example, the administration module 204 stores the configuration object in the data store 214, where it can be accessed by other modules of the reporting platform system 112.

The configuration object defines an initial format in which communication data for the customer will be received by the reporting platform system 112, as well as includes instruction regarding how to parse the communication data and convert the communication data into a revised format desired by the customer. This may include instructions identifying how to parse specified data from the communication data, such as parsing the timestamp, root account identifier, etc. The configuration object also identifies how the data parsed from the communication data is to be stored and organized into data tables, including defining the data tables (e.g., rows, columns, data types, etc.), relationships between the various data tables, a period of time the data is to be retained in the data tables, a location of the data table, name of the data table, etc.

The configuration object may also identify the communication data for the customer, such as how to access the communication data, an identifier for the communication data, etc.

The data intake module 206 receives communication data streams for the various customers of the reporting platform system 112. The communication data stream includes data generated from communications facilitated by the cloud-based communication platform 108 for the customers. For example, the communication data may include data describing call, messages, emails, video and/or other media transmitted for the customer by the cloud-based communication platform 108. This may include metadata describing the type of communication, the time at which the communication was transmitted and/or ended, the payload of the communication, the origin and destination endpoints associated with the communication, a unique identifier for the customer account, etc.

The customer may initiate the communication data stream to the reporting platform system 112, which is received by the data intake module 206. As another example, the data intake module 206 may initiate the communication data stream. For example, the data intake module 206 may access the configuration object from the data storage 214 to access data defining how to initiate the communication data stream, such as data identifying commands to initiate the communication data stream, a location or computing system from which to request the communication data stream, etc.

The indexing module 208 converts the communication data from the communication data stream based on the configuration objection. For example, the indexing module 208 accesses the configuration object from the data storage 214 and uses the configuration object to convert the communication data in the communication data stream from the initial format into the subsequent format defined by the customer. This includes generating the data tables as defined by the configuration object, parsing data from the communication data steam, and populating the data tables with the extracted data as dictated by the configuration object. The indexing module 208 may perform this functionality in real-time or near real-time as the communication data stream is received by the reporting platform system 112. The data tables are stored in the data storage 214 and made accessible to other modules of the reporting platform system 112.

The query module 210 provides query functionality in relation to the converted communication data stored in the data tables. Query functionality includes executing search queries, generating custom reports, setting conditions for notifications and/or automated actions. To provide query functionality, the query module 210 gathers query parameters from a user. The query parameters define the scope of the data requested by the user. For example, the query parameters may include data dimensions and measures. A data dimension is data type or field stored in the data tables. For example, a data dimension may be calls, messages, users, etc. A data measure is a mathematical function to generate a numerical value. For example, a data measure may be a mathematical function, such as calculating a sum, average, difference, etc. Accordingly, a user that wants to know the number of calls that were executed may provide a data dimension "calls" along with a data measure "sum," which would provide a sum of all the calls.

In addition to the data dimensions and measure, the query parameters may further include data defining the scope of the query. For example, the query parameters may indicate a time frame, geographic region, and/or other limitation on the scope of the query. Accordingly, a user may limit a query for the number of calls to the number of calls within a certain time frame and/or that occurred within a specified geographic region.

The query module 210 may generate a report, graph, or other visual output based on the requested query. For example, the query module 210 may generate the report based on user specified parameters regarding the data to be included, format, etc. In some embodiments, a customer may request that recurring reports be generated. Accordingly, the query module 210 may regenerate the requested report at specified time intervals or based on certain events. For example, the customer may specify the time intervals, such as weekly, daily, hourly, etc. As another example, the user may specify that the report be generated each time a user or set of specified users logs into a certain system. This type of embodiment may be used to provide the user with the report within a user interface dashboard incorporated into the client's system.

The query module 210 further allows customers to set auto generated alerts and/or notifications, as well as configure performance of automated actions. For example, the query module 210 may enable the customer to define conditions that, if met, result in execution of a notification, alert and/or action. For example, the conditions may be time-based conditions and/or communication data-based conditions. A time-based condition may include setting specified times or intervals of times in which the customer would like a notification, alert and/or action to be performed. A communication data-based condition may include occurrence of certain events as determined from the communication data. For example, the customer may define query parameters as well as thresholds to define the communication data-based conditions, such as a threshold number of calls being performed within a specified time frame, a threshold number of call failures occurring within a specified time frame, etc.

The customer may also define the notification, alert and/or action to be performed if the user defined condition is met. For example, the customer may define the type of data to be included in the notification and/or alert, as well as recipients that should receive the alert. Similarly, the customer may specify the automated action to be performed if a condition is met, such as modifying communication settings associated with a user account, blocking a specified user from using communication functionality, engaging use of a backup system or resource, allocating new resources, blocking an endpoint device, etc.

The output module 212 outputs data for the reporting platform system 112. This may include transmitting notifications and/or alerts, such as by sending emails, initiating phone calls, sending text or direct messages, etc. The output module 212 may also output reports or other data directly to a user. For example, the output module 212 may transmit a generated report using any of the above described communication methods.

In some embodiments, a customer may wish to maintain a local copy of the converted communication data generated by the reporting platform system 112. Accordingly, the output module 212 may transmit the converted communication data to a computing device or computing system defined by the customer. For example, the output module 212 gathers the converted communication data from the data storage and transmits the converted communication data to the defining computing device or computing system.

Figure 3:
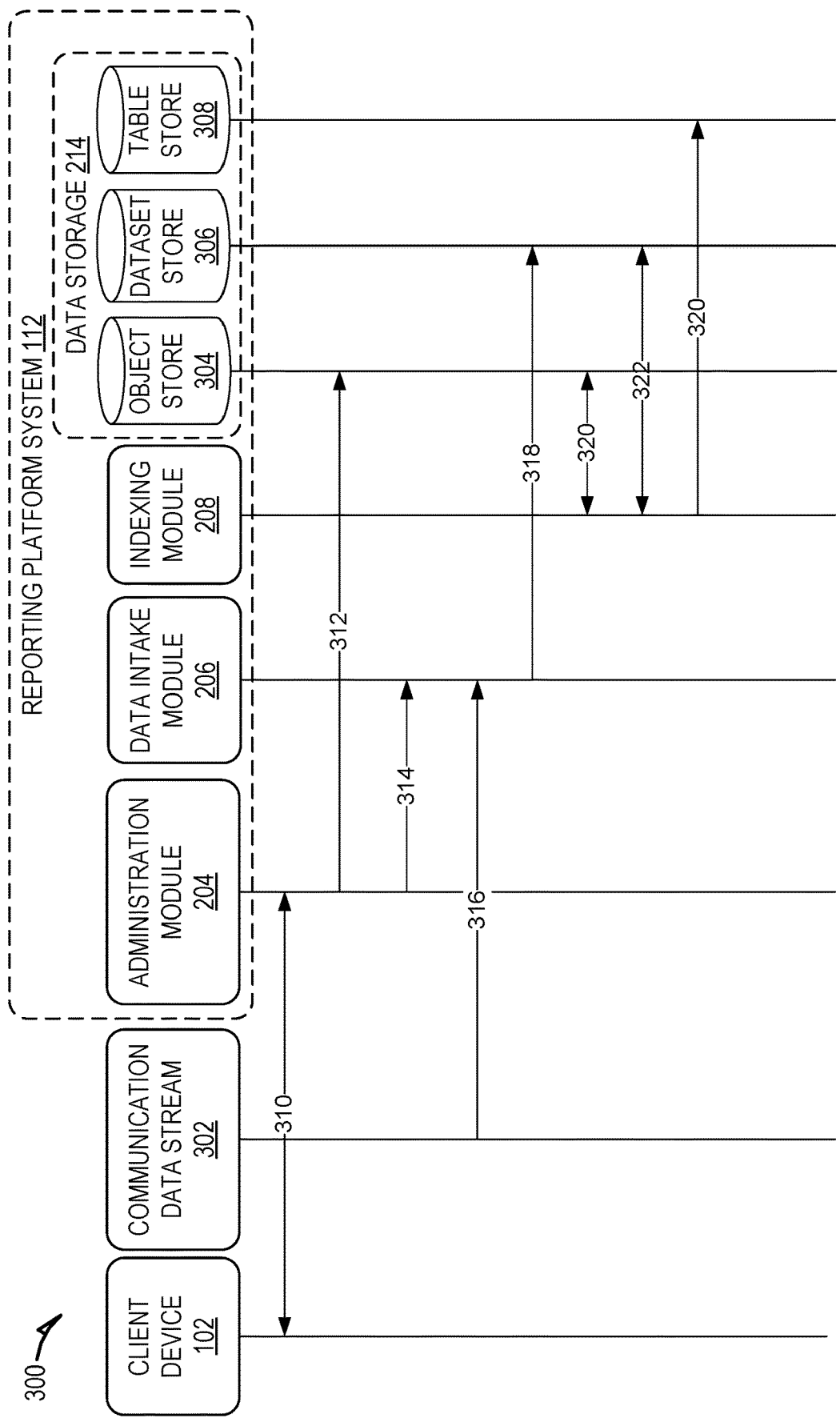
FIG. 3 shows communications within a system for providing customized reporting functionality, according to some example embodiments.

FIG. 3 shows communications within a system 300 for providing customized reporting functionality, according to some example embodiments. To avoid obscuring the inventive subject matter with unnecessary detail, various functional components (e.g., modules, devices, databases, etc.) that are not germane to conveying an understanding of the inventive subject matter have been omitted from FIG. 3. However, a skilled artisan will readily recognize that various additional functional components may be supported by the system 300 and/or the reporting platform system 112 to facilitate additional functionality that is not specifically described herein. Furthermore, the various functional components depicted in FIG. 3 may reside on a single computing device or may be distributed across several computing devices in various arrangements such as those used in cloud-based architectures.

As shown, the system 300 includes a client device 102, a communication data stream 302, and a reporting platform system 112. The reporting platform system 112 includes an administration module 204, a data intake module 206, an indexing module 208, and a data storage 214. The data storage 214 includes an object store 304, a dataset store 306 and a table store 308.

The client device 102 communicates 310 with the administration module 204 to initiate a data communication intake for providing reporting. For example, a customer uses the client device 102 to provide the administration module 204 with a configuration object that includes data used by the reporting platform system 112 to initiate intake of the communication data stream and convert the communication data stream from an initial format into a format desired by the customer.

As the configuration object will be used by the various modules of the reporting platform system 112, the administration module 204 stores 312 the configuration object in the object store 304, where it can be accessed by other modules of the reporting platform system 112. For example, the administration module associated the configuration object with a unique identifier for the corresponding client. The other modules may use the unique identifier to access the configuration object from the object store 304.

The administration module 204 further notifies 314 the data intake module 206 to initiate ingestion of the communication data stream 302. Accordingly, the data intake module 206 initiates ingestion 316 of the communication data stream 302. The data intake module 206 stores the ingested communication stream data in the dataset store 306, where it may be accessed by other modules of the reporting platform system 112.

The indexing module 208 converts the communication data stream from is initial format into a subsequent format specified by the customer in the configuration object. To accomplish this, the indexing module retrieves 320 the configuration object associated with the customer from the object store 304. The indexing module 208 also gathers the customer's communication data stream from the data set store 306. The indexing module 208 converts the communication data stream into the subsequent format based on the configuration object. This includes parsing the communication data stream to extract specified data values and storing 320 the extracted data values in corresponding data tables stored in the table store 308.

Figure 4:
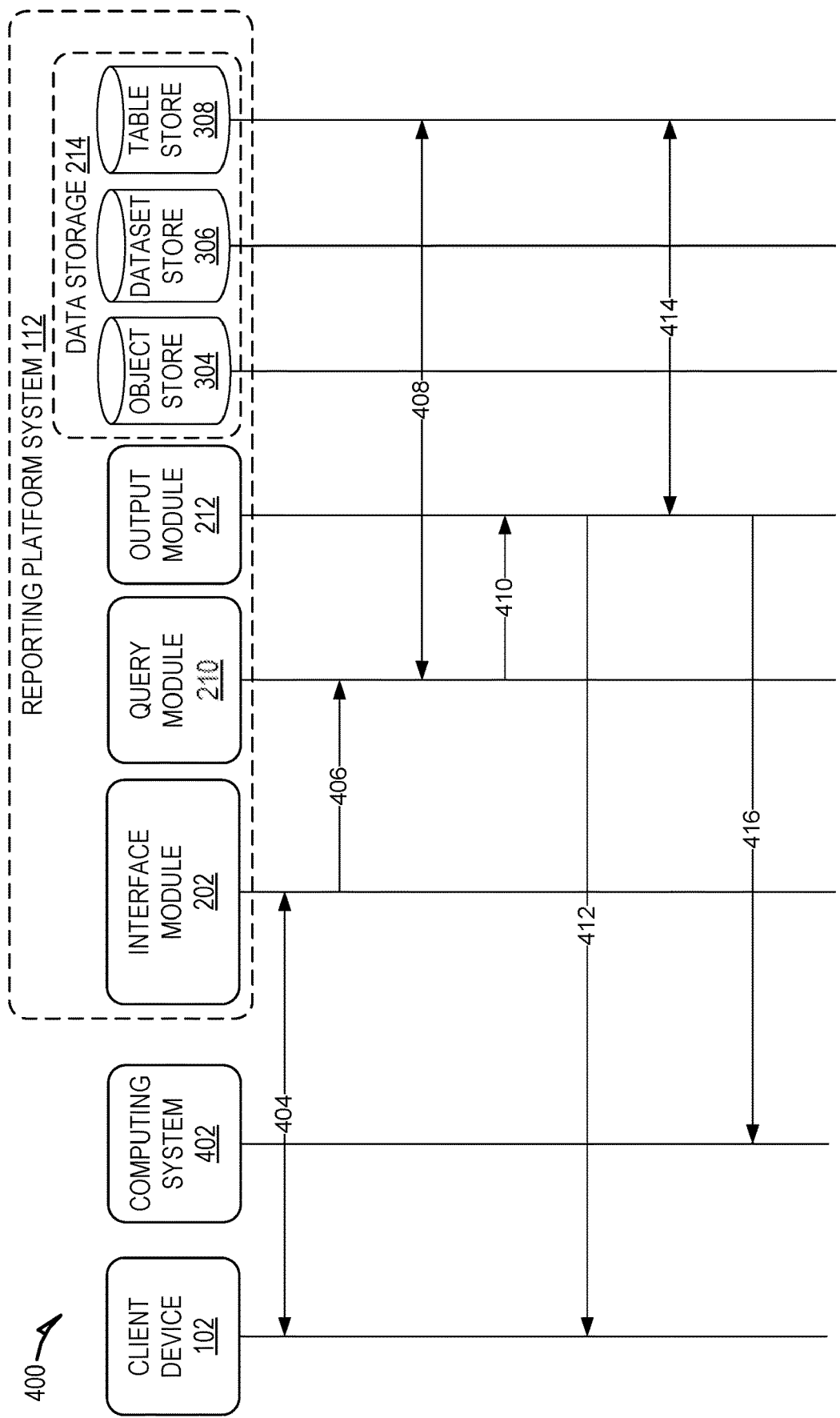
FIG. 4 shows communications within a system for providing query functionality on converted communication data, according to some example embodiments.

FIG. 4 shows communications within a system 400 for providing query functionality on converted communication data, according to some example embodiments. To avoid obscuring the inventive subject matter with unnecessary detail, various functional components (e.g., modules, devices, databases, etc.) that are not germane to conveying an understanding of the inventive subject matter have been omitted from FIG. 4. However, a skilled artisan will readily recognize that various additional functional components may be supported by the system 400 and/or the reporting platform system 112 to facilitate additional functionality that is not specifically described herein. Furthermore, the various functional components depicted in FIG. 4 may reside on a single computing device or may be distributed across several computing devices in various arrangements such as those used in cloud-based architectures.

As shown, the system 400 includes a client device 102, a computing system 402, and a reporting platform system 112. The reporting platform system 112 includes an interface module 202, a query module 210, an output module 212, and a data storage 214. The data storage 214 includes an object store 304, a dataset store 306 and a table store 308.

As show, the client device 102 communicates 404 with the interface module 202 to utilize query functionality provided by the reporting platform system 112. For example, a user uses the client device 102 to communicate 404 with the reporting platform system 112 and access a query interface provided by the interface module 202. The query interface is presented on a display of the client device 102 and allows the user to enter query parameters to initiate a query, generate a report, set alerts, etc. The query parameters define the scope of the data requested by the user. For example, the query parameters may include data dimensions and measures.

The interface module 202 communicates 406 the query parameters to the query module 210. In turn, the query module 210 uses the query parameters to execute a query 408 on the converted data stored in the table sore 308. This includes searching the converted data and retrieving corresponding search results. The query module 210 may use the retrieved data to generate a report or other requested data output.

The query module 210 provides the generated data output 410 to the output module 212. In turn, the output module 212 returns the generated output 412 to the client device 102.

In some embodiments, customers may wish to maintain a copy of the converted communication data. For example, a customer may wish to simply store the converted communication data within their local system for recording purposes. As another example, a customer may wish to maintain a copy of the converted communication data for use in customer-developed or third-party tools. Accordingly, the reporting platform system 112 may provide the converted communication data to an external computing system 402 defined by the customer. an external computing system 402 is a computing system that is external to the reporting platform system 112. For example, the external computing system 402 may be an external computing system 402 of the customer or a third-party. To provide the converted communication data to the customer, the output module 212 communicates 414 with the table store 308 to access the converted communication data. The output module 212 then transmits 416 the converted communication data to the external computing system 402 defined by the customer.

Figure 5:
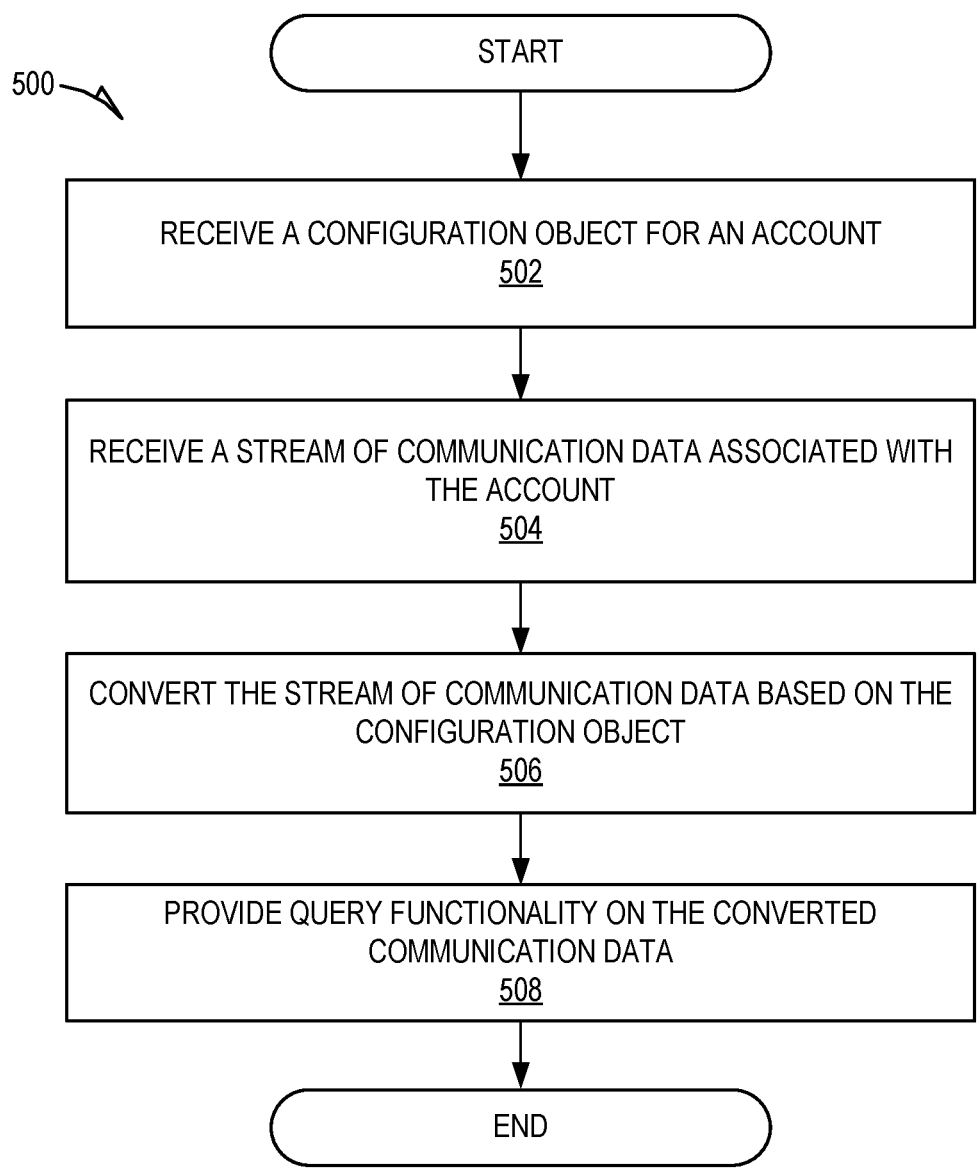
FIG. 5 is a flowchart showing an example method of converting a communication data stream, according to some example embodiments.

FIG. 5 is a flowchart showing an example method 500 of converting a communication data stream, according to some example embodiments. The method 500 may be embodied in computer readable instructions for execution by one or more processors such that the operations of the method 500 may be performed in part or in whole by the reporting platform system 112; accordingly, the method 500 is described below by way of example with reference thereto.

However, it shall be appreciated that at least some of the operations of the method 500 may be deployed on various other hardware configurations and the method 500 is not intended to be limited to the reporting platform system 112.

At operation 502, the administration module 204 receives a configuration object for an account. The configuration object is a data object that defines an initial format in which communication data for the customer will be received by the reporting platform system 112, as well as a subsequent format into which the reporting platform system 112 is to convert the received communication data. For example, the configuration object may include instructions for parsing the received communication data to extract desired portions of the communication data, as well as how the extracted data should be formatted and/or added to data tables.

In some embodiments, the administration module 204 gathers the configuration object through use of an administration interface provided by the interface module 202. For example, the customer uses a client device 102 to communicate with the cloud-based communication platform 108 and access the administration interface. The administration interface may prompt the customer data, which is used to generate the configuration object. Alternatively, the customer may prepare the configuration object, which is transmitted to the reporting platform system 112 and received by the administration module 204.

The configuration object provides data used by the various modules of the reporting platform system 112 to enable communication data ingestion, conversion and reporting. Accordingly, the administration module 204 makes the configuration object available to the various modules. For example, the administration module 204 stores the configuration object in the data store 214, where it can be accessed by other modules of the reporting platform system 112.

At operation 504, the data intake module 206 receives a stream of communication data associated with the account. The communication data stream includes data generated from communications facilitated by the cloud-based communication platform 108 for the customers. For example, the communication data may include data describing call, messages, emails, video and/or other media transmitted for the customer by the cloud-based communication platform 108. This may include metadata describing the type of communication, the time at which the communication was transmitted and/or ended, the payload of the communication, the origin and destination endpoints associated with the communication, a unique identifier for the customer account, etc.

At operation 506, the indexing module 208 converts the stream of communication data based on the configuration object. For example, the indexing module 208 accesses the configuration object from the data storage 214 and uses the configuration object to convert the communication data in the communication data stream from the initial format into the subsequent format defined by the customer. This includes generating the data tables as defined by the configuration object, parsing data from the communication data steam, and populating the data tables with the extracted data as dictated by the configuration object. The indexing module 208 may perform this functionality in real-time or near real-time as the communication data stream is received by the reporting platform system 112. The data tables are stored in the data storage 214 and made accessible to other modules of the reporting platform system 112.

At operation 508, the reporting platform system 112 provides query functionality on the converted communication data. For example, the reporting platform system 112 allows a user to execute queries, generate reports, set alerts and/or notification, automate actions, etc. An example or providing query functionality is described in greater detail in relation to FIG. 6.

Figure 6:
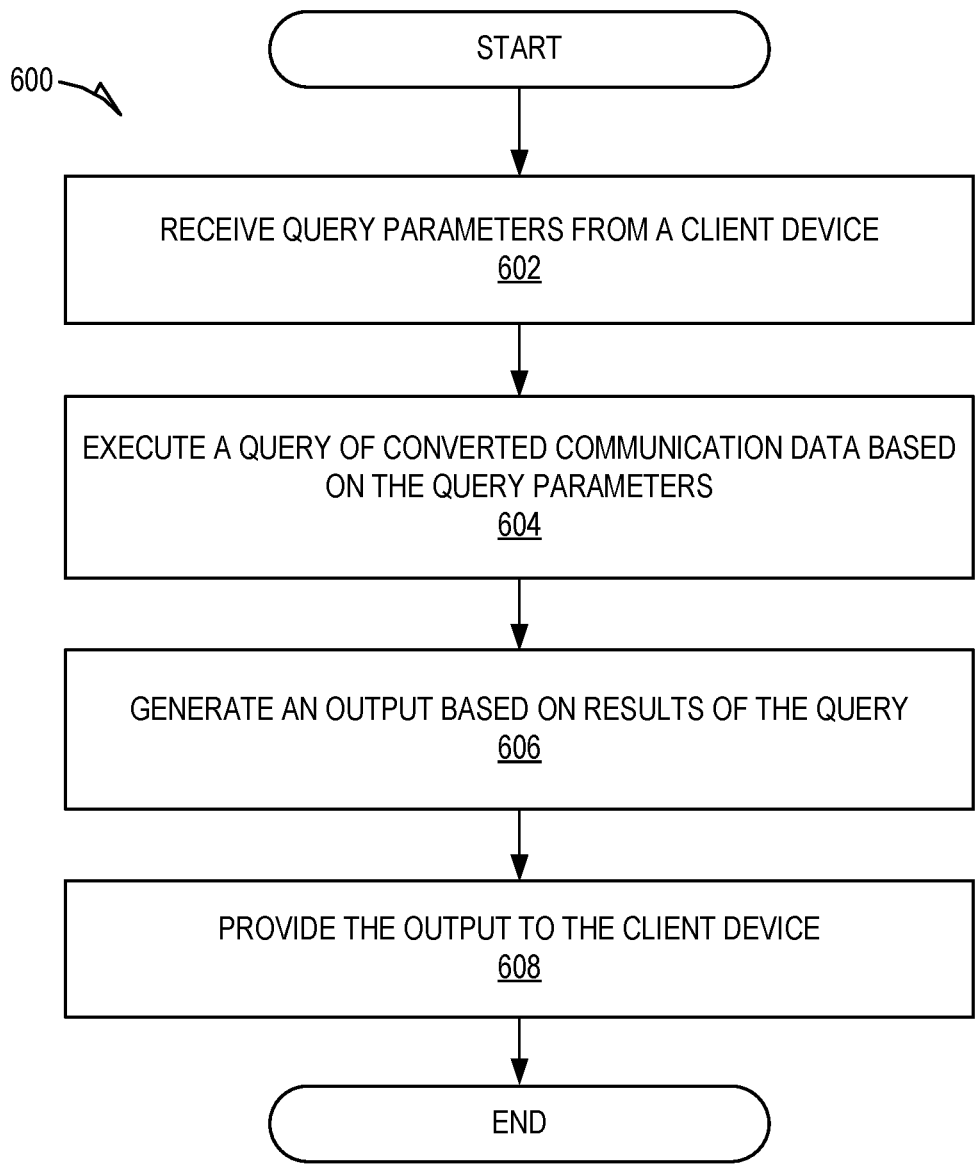
FIG. 6 is a flowchart showing an example method of providing query functionality, according to some example embodiments.

FIG. 6 is a flowchart showing an example method 600 of providing query functionality, according to some example embodiments. The method 600 may be embodied in computer readable instructions for execution by one or more processors such that the operations of the method 600 may be performed in part or in whole by the reporting platform system 112; accordingly, the method 600 is described below by way of example with reference thereto. However, it shall be appreciated that at least some of the operations of the method 600 may be deployed on various other hardware configurations and the method 600 is not intended to be limited to the reporting platform system 112.

At operation 602, the interface module 202 receives query parameters from a client device 102. For example, a user uses a client device 102 to communicate with the reporting platform system 112 and access a query interface provided by the interface module 202. The query interface is presented on a display of the client device 102 and allows the user to enter query parameters to initiate a query, generate a report, set alerts, etc. The query parameters define the scope of the data requested by the user. For example, the query parameters may include data dimensions and measures.

The interface module 202 communicates the query parameters to the query module 210. In turn, at operation 604, the query module 210 executes a query of converted communication data based on the query parameters. That is, the query module 210 uses the query parameters to execute a query on the converted data stored in the table sore 308. This includes searching the converted data and retrieving corresponding search results. The query module 210 may use the retrieved data to generate a report or other requested data output.

At operation 606, the query module 210 generates an output based on results if the query. For example, the query module 210 may use the retrieved data to generate a report or other requested data output.

At operation 608, the output module 212 provides the output to the client device 102. The client device 102 may presented the received output on a display of the client device 102. For example, the client device 102 may present a generated report, data output, etc.

Software Architecture

Figure 7:
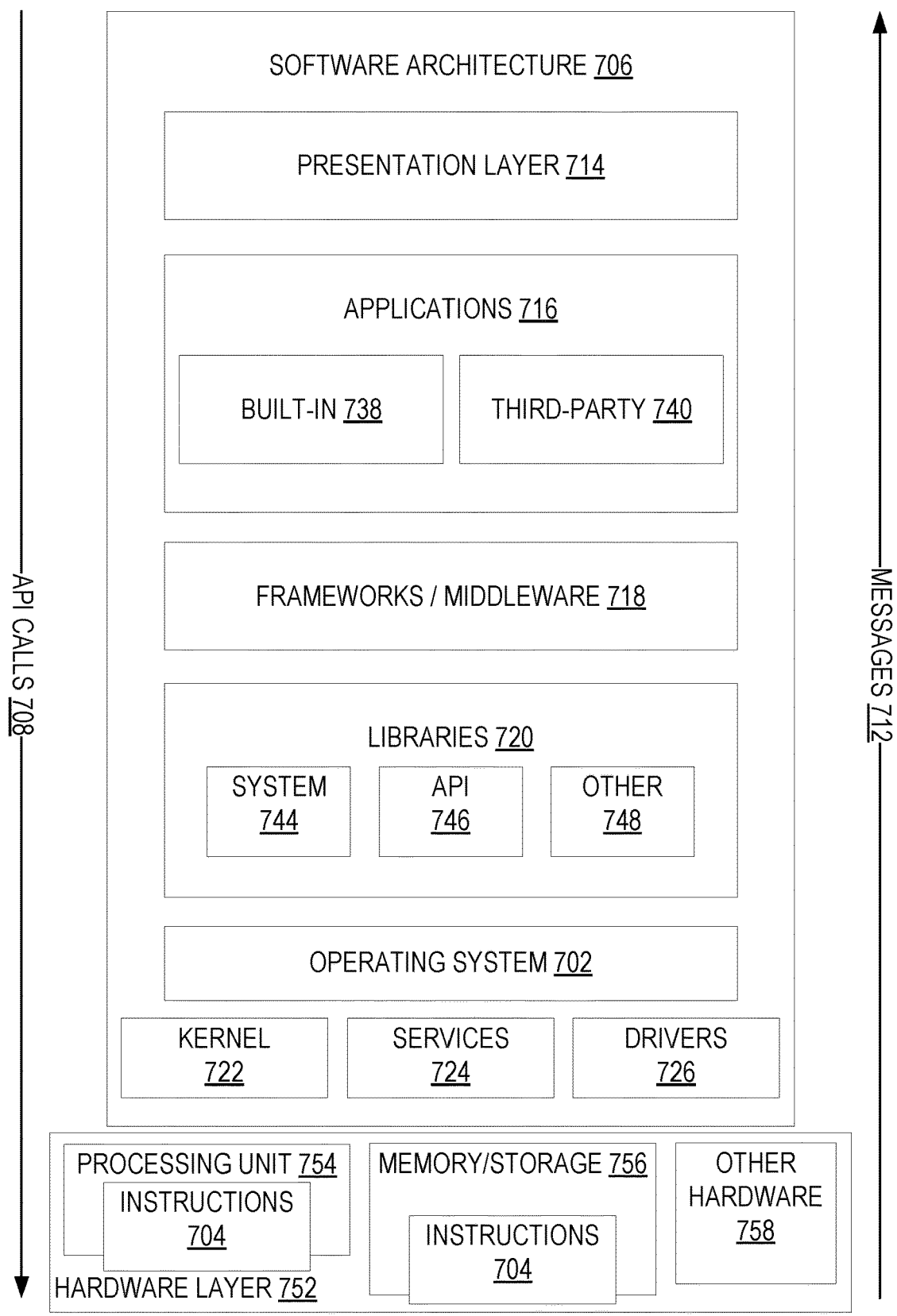
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating an example software architecture 706, which may be used in conjunction with various hardware architectures herein described. FIG. 7 is a non-limiting example of a software architecture 706 and it will be appreciated that many other architectures may be implemented to facilitate the functionality described herein. The software architecture 706 may execute on hardware such as machine 800 of FIG. 8 that includes, among other things, processors 804, memory 814, and (input/output) I/O components 818. A representative hardware layer 752 is illustrated and can represent, for example, the machine 800 of FIG. 8. The representative hardware layer 752 includes a processing unit 754 having associated executable instructions 704. Executable instructions 704 represent the executable instructions of the software architecture 706, including implementation of the methods, components, and so forth described herein. The hardware layer 752 also includes memory and/or storage modules 756, which also have executable instructions 704. The hardware layer 752 may also comprise other hardware 758.

In the example architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716, and a presentation layer 714. Operationally, the applications 716 and/or other components within the layers may invoke application programming interface (API) calls 708 through the software stack and receive a response such as messages 712 in response to the API calls 708. The layers illustrated are representative in nature and not all software architectures have all layers. For example, some mobile or special purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 720 provide a common infrastructure that is used by the applications 716 and/or other components and/or layers. The libraries 720 provide functionality that allows other software components to perform tasks in an easier fashion than to interface directly with the underlying operating system 702 functionality (e.g., kernel 722, services 724, and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 (also sometimes referred to as middleware) provide a higher-level common infrastructure that may be used by the applications 716 and/or other software components/modules. For example, the frameworks/middleware 718 may provide various graphical user interface (GUI) functions, high-level resource management, high-level location services, and so forth. The frameworks/middleware 718 may provide a broad spectrum of other APIs that may be used by the applications 716 and/or other software components/modules, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. Third-party applications 740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 740 may invoke the API calls 708 provided by the mobile operating system (such as operating system 702) to facilitate functionality described herein.

The applications 716 may use built in operating system functions (e.g., kernel 722, services 724, and/or drivers 726), libraries 720, and frameworks/middleware 718 to create UIs to interact with users of the system. Alternatively, or additionally, in some systems, interactions with a user may occur through a presentation layer, such as presentation layer 714. In these systems, the application/component "logic" can be separated from the aspects of the application/component that interact with a user.

Figure 8:
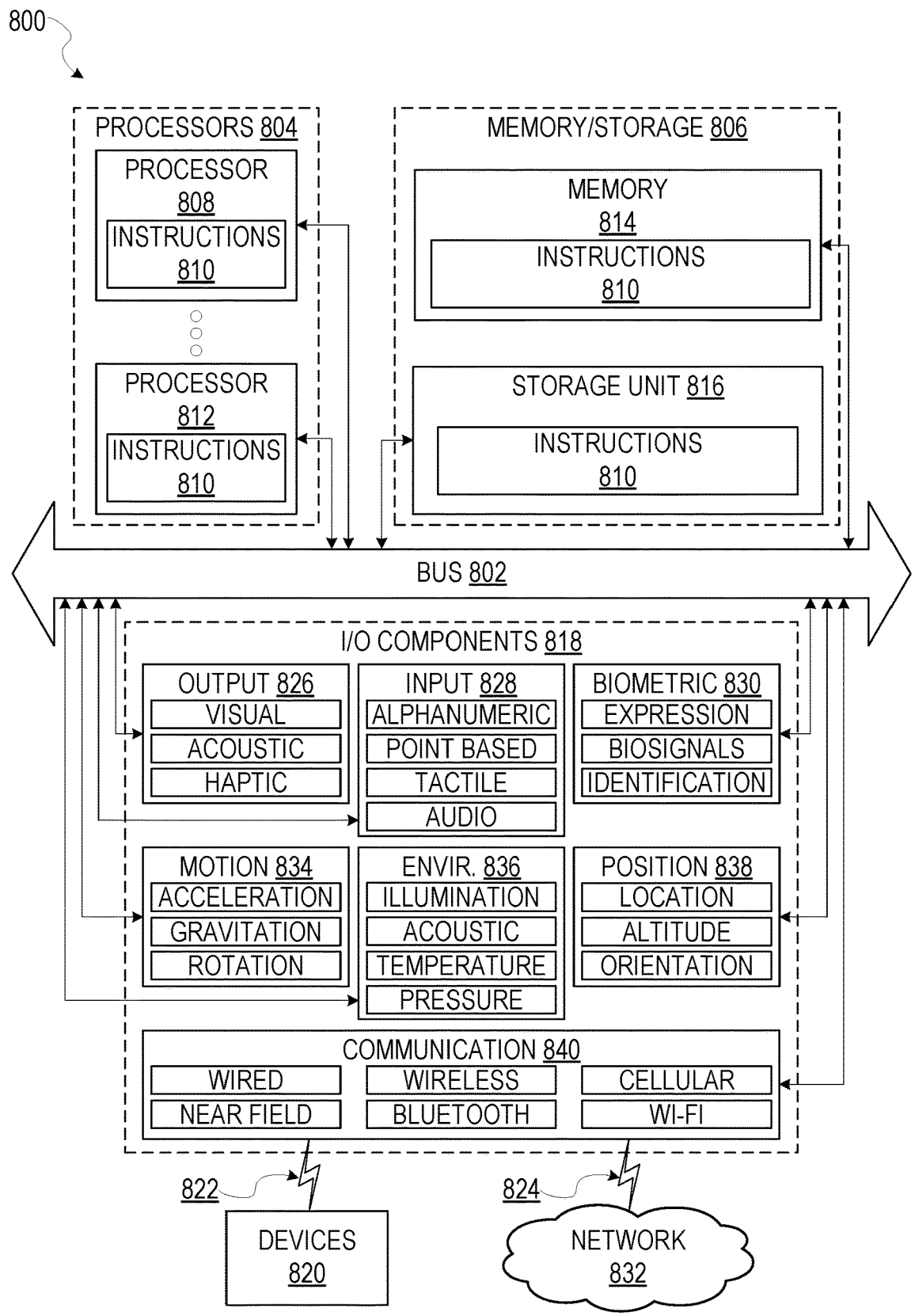
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions 704 from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 800 capable of executing the instructions 810, sequentially or otherwise, that specify actions to be taken by machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory/storage 806, and I/O components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 may include a wide variety of components to receive input, provide output, produce output, transmit information, exchange information, capture measurements, and so on. The specific I/O components 818 that are included in a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion and the grouping is in no way limiting. In various example embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 818 may include biometric components 830, motion components 834, environmental components 836, or position components 838 among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via coupling 824 and coupling 822, respectively. For example, the communication components 840 may include a network interface component or other suitable device to interface with the network 832. In further examples, communication components 840 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 810 for execution by the machine 800, and includes digital or analog communications signals or other intangible medium to facilitate communication of such instructions 810. Instructions 810 may be transmitted or received over the network 832 using a transmission medium via a network interface device and using any one of a number of well-known transfer protocols.

"CLIENT DEVICE" in this context refers to any machine 800 that interfaces to a communications network 832 to obtain resources from one or more server systems or other client devices 102, 104. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 832.

"COMMUNICATIONS NETWORK" in this context refers to one or more portions of a network 832 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 832 or a portion of a network 832 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 810 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 810. The term "machine-readable medium" shall also be taken to include any medium, or combination of multiple media, that is capable of storing instructions 810 (e.g., code) for execution by a machine 800, such that the instructions 810, when executed by one or more processors 804 of the machine 800, cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 804) may be configured by software (e.g., an application 716 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 804 or other programmable processor 804. Once configured by such software, hardware components become specific machines 800 (or specific components of a machine 800) uniquely tailored to perform the configured functions and are no longer general-purpose processors 804. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 804 configured by software to become a special-purpose processor, the general-purpose processor 804 may be configured as respectively different special-purpose processors (e.g., comprising different hardware components) at different times. Software accordingly configures a particular processor or processors 804, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 802) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 804 that are temporarily configured (e.g., by software) or permanently configured to perform the relevant operations. Whether temporarily or permanently configured, such processors 804 may constitute processor-implemented components that operate to perform one or more operations or functions described herein. As used herein, "processor-implemented component" refers to a hardware component implemented using one or more processors 804. Similarly, the methods described herein may be at least partially processor-implemented, with a particular processor or processors 804 being an example of hardware. For example, at least some of the operations of a method may be performed by one or more processors 804 or processor-implemented components. Moreover, the one or more processors 804 may also operate to support performance of the relevant operations in a "cloud computing" environment or as a "software as a service" (SaaS). For example, at least some of the operations may be performed by a group of computers (as examples of machines 800 including processors 804), with these operations being accessible via a network 832 (e.g., the Internet) and via one or more appropriate interfaces (e.g., an API). The performance of certain of the operations may be distributed among the processors 804, not only residing within a single machine 800, but deployed across a number of machines 800. In some example embodiments, the processors 804 or processor-implemented components may be located in a single geographic location (e.g., within a home environment, an office environment, or a server farm). In other example embodiments, the processors 804 or processor-implemented components may be distributed across a number of geographic locations.

"PROCESSOR" in this context refers to any circuit or virtual circuit (a physical circuit emulated by logic executing on an actual processor 804) that manipulates data values according to control signals (e.g., "commands," "op codes," "machine code," etc.) and which produces corresponding output signals that are applied to operate a machine 800. A processor 804 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 804 may further be a multi-core processor having two or more independent processors 804 (sometimes referred to as "cores") that may execute instructions 810 contemporaneously.

What is claimed is:

1. A method comprising:
receiving a configuration object associated with a first account of a communication platform, the communication platform including a plurality of modules, the plurality of modules including an indexing module and a query module, the configuration object defining a first format, the first format including a format in which communication data associated with the first account will be received by the communication platform, the configuration object further defining a second format, the second format including a format into which the communication platform is to convert the communication data, the configuration object further including instructions for generating one or more data tables and extracting at least a first portion of the communication data for populating the one or more data tables, the configuration object made accessible to each of the plurality of modules based on a unique identifier associated with the configuration object, wherein the configuration object identifies at least a first data dimension;

parsing the communication data to identify a first subset of the communication data associated with the first data dimension;

entering the first subset of the communication data associated with the first data dimension into a first portion of the one or more data tables associated with the first data dimension;

receiving the communication data associated with the first account from one or more remote computing devices, the communication data generated in the first format by the one or more remote computing devices based on communications facilitated for the first account by the communication platform and transmitted to the communication platform in real time;

based on an initiation of a communication data stream from the first account, accessing the configuration object from the indexing module of the communication platform and converting the communication data from the first format to the second format according to the configuration object, the converting including accessing the configuration object, using the configuration object to convert the communication data from the first format to the second format, generating the one or more data tables, and populating the one or more data tables with the at least the first portion of the communication data; and providing, via the query module, query functionality on the converted communication data.

2. The method of claim 1, further comprising:
providing at least a portion of the converted communication data to an external computing system associated with the first account.

3. The method of claim 1, wherein providing query functionality on the converted communication data comprises:
receiving a first query identifying the first data dimension and a first measure;
analyzing a first portion of the one or more data tables based on the first measure, yielding an output value; and
returning the output value in response to the first query.

4. The method of claim 1, further comprising:
receiving, by the communication platform, a second configuration object for a second account, the second configuration object defining a third format in which communication data associated with the second account will be streamed to the communication platform, and instructions for reformatting the communication data from the third format into a fourth format, the third format being different than the first format.

5. The method of claim 4, further comprising:
receiving a second stream of communication data associated with the second account, the second stream of communication data received in the third format;
converting, from the third format to the fourth format according to the second configuration object for the second account, the second stream of communication data in real time as the communication data is received by the communication platform, yielding second converted communication data for the second account; and
providing query functionality on the second converted communication data.

6. A reporting platform system comprising:
one or more computer processors; and
one or more computer-readable mediums storing instructions that, when executed by the one or more computer processors, cause the reporting platform system to perform operations comprising:
receiving a configuration object associated with a first account of a communication platform, the communication platform including a plurality of modules, the plurality of modules including an indexing module and a query module, the configuration object defining a first format, the first format including a format in which communication data associated with the first account will be received by the communication platform, the configuration object further defining a second format, the second format including a format into which the communication platform is to convert the communication data, the configuration object further including instructions for generating one or more data tables and extracting at least a first portion of the communication data for populating the one or more data tables, the configuration object made accessible to each of the plurality of modules based on a unique identifier associated with the configuration object, wherein the configuration object identifies at least a first data dimension;

parsing the communication data to identify a first subset of the communication data associated with the first data dimension;

entering the first subset of the communication data associated with the first data dimension into a first portion of the one or more data tables associated with the first data dimension;

receiving the communication data associated with the first account from one or more remote computing devices, the communication data generated in the first format by the one or more remote computing devices based on communications facilitated for the first account by the communication platform and transmitted to the communication platform in real time;

based on an initiation of a communication data stream from the first account, accessing the configuration object from the indexing module of the communication platform and converting the communication data from the first format to the second format according to the configuration object, the converting including accessing the configuration object, using the configuration object to convert the communication data from the first format to the second format, generating the one or more data tables, and populating the one or more data tables with the at least the first portion of the communication data; and providing, via the query module, query functionality on the converted communication data.

7. The reporting platform system of claim 6, the operations further comprising:
providing at least a portion of the converted communication data to an external computing system associated with the first account.

8. The reporting platform system of claim 6, wherein providing query functionality on the converted communication data comprises:
receiving a first query identifying the first data dimension and a first measure;
analyzing a first portion of the one or more data tables based on the first measure, yielding an output value; and
returning the output value in response to the first query.

9. The reporting platform system of claim 6, the operations further comprising:
receiving a second configuration object for a second account, the second configuration object defining a third format in which communication data associated with the second account will be streamed to the reporting platform system, and instructions for reformatting the communication data from the third format into a fourth format, the third format being different than the first format.

10. The reporting platform system of claim 9, the operations further comprising:
receiving second communication data associated with the second account, the second communication data received in the third format;
converting, from the third format to the fourth format according to the second configuration object for the second account, the second communication data received in real time as the communication data is received by the communication platform, yielding second converted communication data for the second account; and
providing query functionality on the second converted communication data.

11. A non-transitory computer-readable medium storing instructions that, when executed by one or more computer processors of a reporting platform system, cause the reporting platform system to perform operations comprising:
receiving a configuration object associated with a first account of a communication platform, the communication platform including a plurality of modules, the plurality of modules including an indexing module and a query module, the configuration object defining a first format, the first format including a format in which communication data associated with the first account will be received by the communication platform, the configuration object further defining a second format, the second format including a format into which the communication platform is to convert the communication data, the configuration object further including instructions for generating one or more data tables and extracting at least a first portion of the communication data for populating the one or more data tables, the configuration object made accessible to each of the plurality of modules based on a unique identifier associated with the configuration object, wherein the configuration object identifies at least a first data dimension;
parsing the communication data to identify a first subset of the communication data associated with the first data dimension;
entering the first subset of the communication data associated with the first data dimension into a first portion of the one or more data tables associated with the first data dimension;
receiving the communication data associated with the first account from one or more remote computing devices, the communication data generated in the first format by the one or more remote computing devices based on communications facilitated for the first account by the communication platform and transmitted to the communication platform in real time;
based on an initiation of a communication data stream from the first account, accessing the configuration object from the indexing module of the communication platform and converting the communication data from the first format to the second format according to the configuration object, the converting including accessing the configuration object, using the configuration object to convert the communication data from the first format to the second format, generating the one or more data tables, and populating the one or more data tables with the at least the first portion of the communication data; and
providing, via the query module, query functionality on the converted communication data.

12. The non-transitory computer-readable medium of claim 11, the operations further comprising:
providing at least a portion of the converted communication data to an external computing system associated with the first account.

13. The non-transitory computer-readable medium of claim 11, wherein providing query functionality on the converted communication data comprises:
receiving a first query identifying the first data dimension and a first measure;
analyzing a first portion of the one or more data tables based on the first measure, yielding an output value; and
returning the output value in response to the first query.

14. The non-transitory computer-readable medium of claim 11, the operations further comprising:
receiving a second configuration object for a second account, the second configuration object defining a third format in which communication data associated with the second account will be streamed to the reporting platform system, and instructions for reformatting the communication data from the third format into a fourth format, the third format being different than the first format;
receiving a second stream of communication data associated with the second account, the second stream of communication data received in the third format;
converting, from the third format to the fourth format according to the second configuration object for the second account, the second stream of communication data in real time as the communication data is received by the reporting platform system, yielding second converted communication data for the second account; and
providing query functionality on the second converted communication data.

* * * * *